United States Patent
Clarke, Jr.

[11] 3,939,581
[45] Feb. 24, 1976

[54] ORGANIC MOLECULAR MODEL ASSEMBLY

[76] Inventor: Frank H. Clarke, Jr., 14 Long Pond Road, Armonk, N.Y. 10504

[22] Filed: Feb. 24, 1975

[21] Appl. No.: 552,103

Related U.S. Application Data

[63] Continuation-in-part of Ser. No. 369,097, June 11, 1973, abandoned.

[52] U.S. Cl. .................................. 35/18 A; 46/29
[51] Int. Cl.² .......................................... G09B 23/26
[58] Field of Search ............. 35/18A, 34; 46/26, 29

[56] References Cited
UNITED STATES PATENTS

| | | | |
|---|---|---|---|
| 3,080,662 | 3/1963 | Brumlik | 35/18 A |
| 3,333,349 | 8/1967 | Brumlik | 35/18 A |
| 3,466,759 | 9/1969 | Brumlik | 35/18 A |

FOREIGN PATENTS OR APPLICATIONS

| | | | |
|---|---|---|---|
| 561,770 | 11/1957 | Belgium | 46/29 |
| 1,281,767 | 12/1961 | France | 46/20 |

OTHER PUBLICATIONS

"Orbit Molecular Building System" Aug. 1971, R.J.M. Exports Ltd. Fairspear House, Leafield, Oxford England pp. 2–9, 19, 20.

*Primary Examiner*—Harland S. Skogquist

[57] ABSTRACT

A color coded molecular model assembly kit is provided for representing organic molecular structures and shapes comprising two basic and complementary construction units capable of being interlocked. The first basic construction units are color coded plastic tubes of three different lengths such that when coupled to two of said second basic construction units the distances between the centers of the coupling means represent 1.36 Angstroms, 1.54 Angstroms and 1.81 Angstroms respectively and represent the bonds between adjacent atoms. The second basic construction units are color coded coupling means for said tubes according to the valency of the atoms to be joined, the center of said coupling means representing atom conters, said coupling means having radial arms substantially located on the surface of a sphere with the center of the coupling unit being the center of the sphere. Said coupling units are made of plastic and are of two types, one type adapted for planar-trigonal coupling of three said tubes separated by angles of about 120° and the other type adapted for tetrahedral coupling of four said tubes separated by angles of about 109°. Said first and second construction units are capable of being joined together and held immobile by friction by having said radial arms and/or the cavities of said tubes tapered so that skeletal models of complex organic macromolecules may be assembled such that the distance between the centers of two directly connected coupling means represents the distance between joined atoms.

9 Claims, 13 Drawing Figures

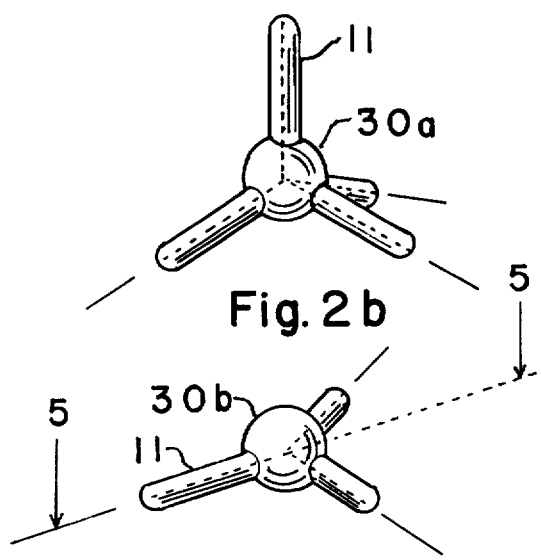
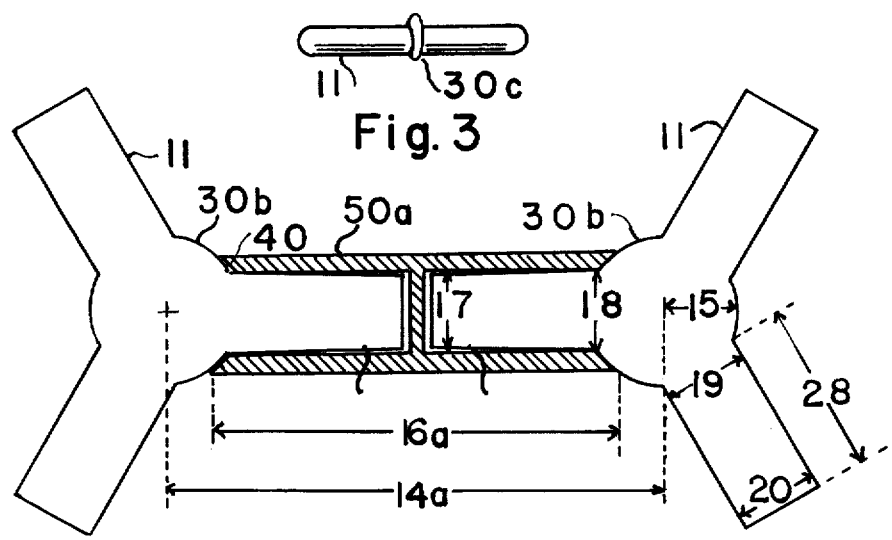
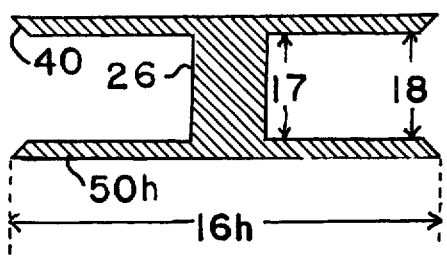
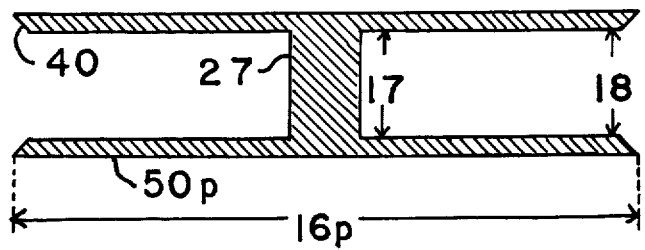

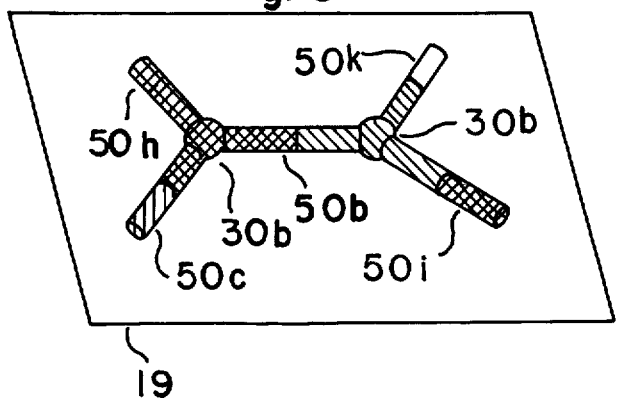
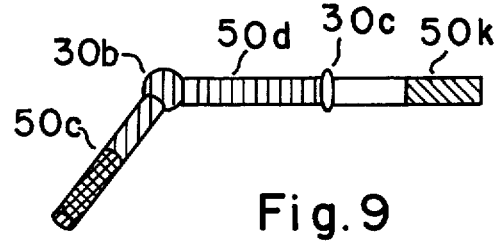
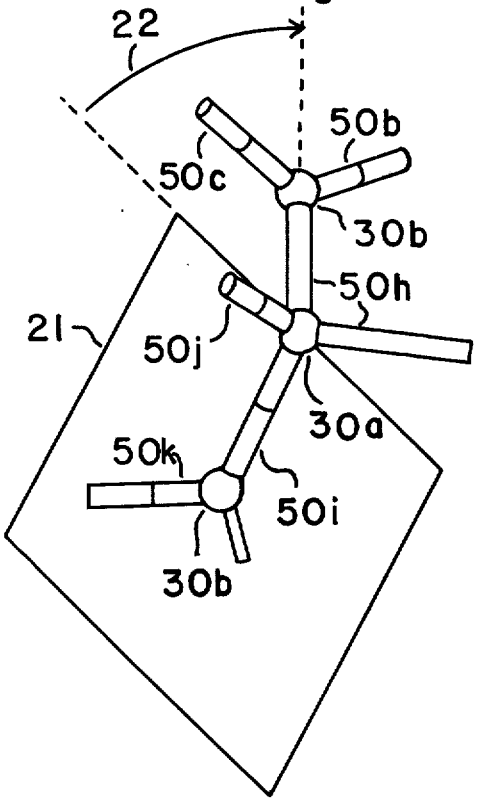
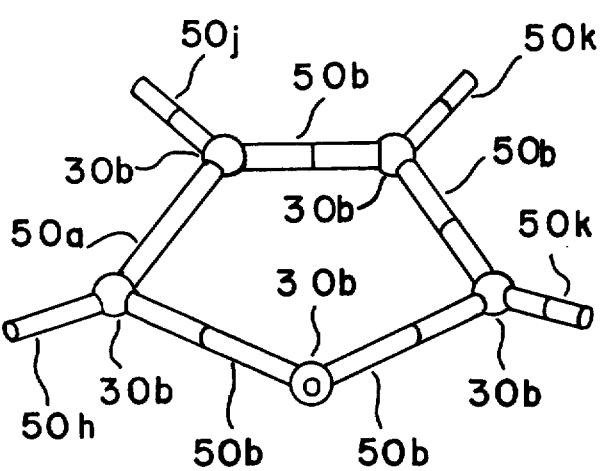
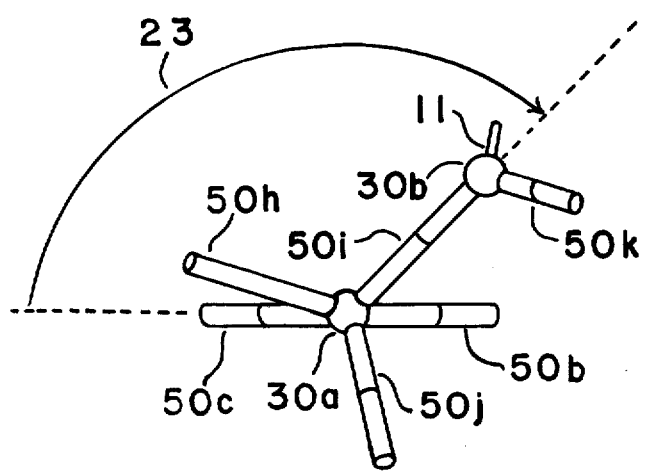
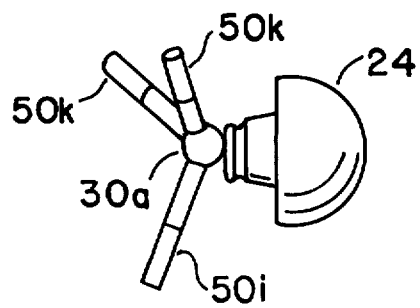

ORGANIC MOLECULAR MODEL ASSEMBLY

This application is a continuation-in-part of copending Ser. No. 369,097 filed June 11, 1973, now abandoned.

BACKGROUND OF THE INVENTION

The present invention relates generally to novel color coded skeletal models empolyed for representing the structures of organic compounds, especially the complex structures of bio-organic molecules. More particularly, it relates to inexpensive kits containing components which may be easily assembled into models of entire enzymes in which the internal envelope of the specificity cavity is clearly visible and defined with sufficient accuracy to be fitted with a Corey-Pauling-Koltun space filling model of a substrate or inhibitor of the enzyme.

Molecular models have been made for over a hundred years and the prior art shows numerous examples of kits for assembling molecular models. While they all have their uses, there still remains a great need for a kit capable of being used to build models of extremely complex structures (such as bio-organic molecules) which contains the attributes of a) low cost; b) ease of assembly; c) accuracy of assembled macromolecule; d) definition of shapes of surface areas and cavities of assembled macromolecule; and e) identification of individual atoms throughout an entire macromolecule.

The present invention provides the attributes described above especially when used in conjunction with the well known Corey-Pauling-Koltun space filling models. Use of the components described in detail in the specifications below makes it possible to represent and study the interactions between an enzyme and its substrate or inhibitor in a convenient and clear manner that has not been available heretofore.

SUMMARY OF THE INVENTION

IN applicant's study of model building it was very surprising to find that the exacting specifications provided in the conventional, more expensive models are in fact, unnecessary for the construction of useful skeletal models of complex bio-organic compounds. THus it was found by experiment and actual construction of models of enzymes that useful and sufficiently accurate skeletal models depicting every atom of entire enzymes can be built with only three different lengths of interconnecting plastic tubesrepresenting bonds rather than having precise lengths which either must be cut individually or supplied in a wide variety of sizes. Furthermore, it was found that useful models of bio-organic macromolecules can be constructed using plastic tubes with only three types of coupling means providing bivalent, planar-trigonal and tetrahedral arrangements of bonds rather that the larger number of precisely oriented coupling means of most conventional skeletal model building kits. The present invention provides model building components consisting of three lengths of plastic tubes representing interatomic bonds and three types of coupling means representing atom centers, said coupling means having radial arms for precisely positioning said tubes in bivalent, planar-trigonal or tetrahedral arrangements.

The present invention also provides a simple and novel means of forming rigid, permanent bonds between the tubes and the radial arms of the coupling means by having the radial arms or the coupling means and/or the internal cavities of the tubes tapered so that a strong frictional bond is formed when a tube is pressed firmly onto the radial arm of a coupling means. This provision now makes the building of complex models a simple and convenient operation.

Furthermore, the present invention provides color coded skeletal models with a scale of 12.5 mm per Angstrom which are complementary to the color coded space filling models of Corey-Pauling-Koltun. The many advantages of complementary skeletal and space filling models have never been adequately described because such complementary models of satisfactory design have not been available heretofore. Studies of the interactions of bio-organic molecules can now be performed in a new and useful manner. For instance, the skeletal model of the active site of an enzyme can be fitted with the complementary space filling model of the substrate or inhibitor. In this manner polar and non-polar interactions can be seen readily. The models of the present invention when used in conjunction with the Corey-Pauling-Koltun models will also facilitate the study of antibody-antigen interactions and the interaction of drug molecules with receptor sites.

The present invention also provides simple and inexpensive components, pre-cut to the proper dimensions so that enzyme model building can be carried out, not only by the professional scientist, but by students as well. The components of the present invention are small, light, color coded and easily assembled. Although they may be easily disassembled, provision has been made such that they may be bonded permanently together so that entire enzyme models may be constructed. The models of large bio-organic macromolecules constructed according to this invention may be supported on only three or four posts which serve to lift the model from the surface of the table on which it rests. The invention also provides a simplified construction technique for models of polypeptides which makes model building of enzymes an exciting and interesting exercise available even to high school students. The completed models of even complex bio-organic molecules such as proteins when constructed with the components of the present invention acording to the process described herein are easily understood from line drawings available in the scientific literature. The colorful models of this invention are so aesthetically pleasing that they may be regarded as works of modern art.

These provisions are realized by a plurality of construction units consisting of three different lengths of color coded interconnecting plastic tubes representing bonds and only two types of coupling means representing atom centers made of plastic and consisting of spherical core having radial arms sized to receive, to frictionally retain and to precisely position said tubes in planar trigonal and tetrahedral arrangements. A third coupling unit is made of metal and is adapted for bivalent coupling of two tubes linearly or at an angle as desired. The provision for making rigid bonds which is required for building models of organic macromolecules is achieved by having the radial arms of the coupling means and/or the cavities of the tubes tapered so that a tight, permanent bond is provided when a plastic tube is pressed firmly onto the radial arm as described in the specifications below. Additional features and advantages of the invention will become apparent during the course of the following specifications and description of the drawings.

BRIEF DESCRIPTION OF THE DRAWINGS

FIGS. 1a through 1s are elevational views of the connecting tubes.

FIGS. 2a through 2c are isometric views of the coupling means representing atom centers.

FIG. 3 is a cross-sectional view along line 5—5 of two of the coupling means of FIG. 2b showing two planar trigonal atom centers and a connecting tube.

FIG. 4 is a cross-sectional view of a tube of medium length.

FIG. 5. is a cross-sectional view of a long tube.

FIG. 6 is an isometric view of a planar peptide bond.

FIG. 7 is an isometric view of a hydrogen bond between a carbonyl oxygen and an amino hydrogen.

FIG. 8 is an isometric view of an imidazole group.

FIG. 9 is an isometric view of a peptide unit which illustrates the measurement of one of the rotational angles.

FIG. 10 is a different isometric view of the peptide unit of FIG. 9 which illustrates the measurement of the second rotational angle.

FIG. 11 is an isometric view of an ammonium group, one nitrogen-hydrogen bond of which is fitted with a Corey-Pauling-Koltun space filling model of a hydrogen atom representing the van der Vaals' envelope.

DETAILED DESCRIPTION OF THE DRAWINGS

In the preferred embodiment of the invention the bonds between the atoms are represented by construction units consisting of color coded plastic tubes as illustrated in detail in FIGS. 1a through 1s. The tubes are of three precut lengths. The shorter tubes in FIGS. 1a through 1g are 0.49 inches (12.5 mm) long such that when coupled to two of the coupling means representing atom centers, the distance between the centers of the coupling means is 0.67 inches (17.0mm) representing an interatomic distance of 1.36 Angstroms. The tubes of medium length, FIGS. 1h through 1o are 0.57 inches (14.5 mm) long, providing a distance of 0.76 inches (19.3 mm) representing 1.54 Angstroms between coupled atom centers and the long tubes, FIGS. 1p through 1s are 0.84 inches (21.7 mm) long providing a distance of 0.89 inches (22.6 mm) representing 1.81 Angstroms between coupled atom centers. The scale used is 12.5 mm or 0.492 inches represents 1.00 Angstrom.

The color code of the connecting tubes and atom centers is illustrated in the drawings as follows: black is heavily cross hatched and represents carbon as in FIG. 1a; blue is diagonally hatched and represents nitrogen as in FIG. 1e; red is vertically hatched and represents oxygen as in FIG. 1d; pale green is lightly stipled and represents fluorine as in FIG. 1g; yellow is diagonally hatched with dotted lines and represents sulfur or phosphorus as in FIG. 1o; green is heavily stipled and represents chlorine as in FIG. 1n; brown is lightly cross hatched and represents bromine as in FIG. 1p; violet is closely diagonally hatched and represents iodine as in FIG. 1q; white is not marked.

FIG. 1a represents the bond joining two unsaturated carbon atoms such as in ethylene or in a benzene ring; FIG. 1b represents the bond joining unsaturated carbon and nitrogen atoms such as in a pyridine ring or the bond linking the nitrogen atom and the carbonyl carbon atom of an amide group; FIG. 1c represents a carbonyl group; FIG. 1d represents the van der Vaals radius of an oxygen atom and is used for hydrogen bonds to oxygen; FIG. 1e represents the van der Vaals radius of a nitrogen atom and is used for hydrogen bonds to nitrogen; FIG. 1f represents a nitrogen-oxygen bond and is used for nitro groups or an oxime group; FIG. 1g represents a carbon-fluorine bond; FIG. 1h is for an aliphatic carbon-carbon bond; FIG. 1i represents the bond between single bonded carbon and nitrogen atoms; FIG. 1j represents the carbon-hydrogen bond; FIG. 1k represents the nitrogen-hydrogen bond; FIG. 1l represents a sulfur-hydrogen or a phosphorus-hydrogen bond; FIG. 1m represents a hydroxyl group; FIG. 1n represents the bond between carbon and chlorine; FIG. 1o represents the bond between sulfur and oxygen or the bond between phosphorus and oxygen; FIG. 1p represents a bond between carbon and bromine; FIG. 1q represents the bond between carbon and iodine; FIG. 1r represents the bond between carbon and sulfur and FIG. 1s represents a disulfide bond.

It is apparent that for single valence atoms such as hydrogen there is no coupling means to represent the center of the hydrogen atom. In such cases the end of the tube represents the center of the single valence atom. Since the construction units of this invention are used to represent the skeleton of a molecule it is also apparent that the distance between hydrogen and carbon, nitrogen, oxygen or sulfur is not critical and each of these bonds is therefore or the same, convenient length. For a hydrogen bond to oxygen, (see below in FIG. 7), the distance to the center of the hydrogen atom does become critical. The somewhat longer bonds to hydrogen of FIG. 1k through 1m are compensated for by the shorter length of the van der Vaals oxygen of FIG. 1d.

The connecting tubes illustrated in FIGS. 1a through 1s are made of colored plastic sized to receive and frictionally retain the radial arms of the coupling means representing atom centers as described in detail below. When the tubes are of two colors one end of the tube is of one solid color extending to midway between the ends of the tube for the short and medium length tubes. For the long tubes in FIGS. 1p through 1r the length of the black band of color is 0.28 inches (7.1 mm). In each case the other end of the tube is of the second solid color. Tubes with tapered cavities (see description below) are made of injection molded plastic that is of one solid color. When the finished tube is of two colors, the second color may be applied with paint. However, since the painting of such short tubes involves considerable labor and is expensive it is an object of this invention to provide a means whereby the tubes may be colored in an inexpensive manner. This is achieved by the use of thin sleeves of colored plastic the internal diameter of which is such that the sleeve may be fitted neatly over the tube. The length of the colored sleeve is approximately 0.28 inches (7.1 mm) and sleeves of the same length are used for tubes of all three different lengths. The color code used in this invention is the same as in the Corey-Pauling-Koltun space filling models.

FIGS. 2a, 2b and 2c show three different embodiments of construction units consisting of coupling means for the tubes illustrated in FIG. 1. The coupling means of FIGS. 2a and 2b are made of plastic while the coupling means of FIG. 2c may be made of a bendable metal such as aluminum. Each of the coupling means of FIG. 2a and FIG. 2b is a small sphere 30 on the surface of which are attached tapered arms 11 extending radially from the surface of the sphere. The arms are sized to receive and frictionally retain the tubes of FIG. 1. Their length is just slightly less than the depth of the internal cavity of the shorter tubes of FIG. 1a to g (see FIG. 3). In FIG. 2a the coupling unit has four arms 11 distributed over the surface of the sphere 30a in a tetrahedral pattern such that the angles between any two arms is slightly larger than 109°. In FIG. 2b there are three arms 11 extending over the surface of the sphere 30b in a Y shaped trigonal, planar arrangement such that the angle between adjacent arms is 120°. In FIG. 2c there are two arms 11 extending linearly 180° from each other about the central ring shaped representation of the atom center 30c.

FIG. 3 is a cross-sectional view of the assembled relationship of two of the coupling means of FIG. 2b and a connecting tube 50a of FIG. 1. The tapered arm 11 fits tightly into the tapered cavity of one end of the tube 50a. The taper of the radial arm 11 of the coupling means is such that the thickness of the arm at its base 19 is slightly larger than the thickness 20 at the tip of the arm. The thickness 19 is approximately 0.120 inches (3.1 mm) and the length 28 of the arm is approximately 0.20 inches (5.08 mm). The tapered cavity of the tube is such that its width 18 at the opening is slightly larger than the width 17 near the bottom of the cavity. The width 18 may be slightly less than the thickness 19 at the base of the arm so that the plastic is squeezed as the arm is pressed into the cavity to make a tight connection. Although optimum bond strength is provided when both the arm 11 and the cavity of the tube are tapered, this invention also encompasses the possibility that either the cavity of the tube is a cylinder and the arm 11 of the coupling means is tapered or the arm 11 of the coupling means has a cylindrical shape and the cavity of the tube is tapered. The opening of the tube has an additional bevel 40 to allow it to fit neatly against the spherical center 30b of the coupling means. The cavities at either end of the tube do not meet but there is a wall 25 at the center of the tube to provide additional strength. The radius 15 of the spherical center 30b of the coupling means is approximately 0.120 inches (3.1 mm) and the distance between the centers of the joined atoms 14a is 0.67 inches (17.0 mm) representing 1.36 Angstroms. Tube 50a is a short tube of FIG. 1a with a length 16a of 0.49 inches (12.5 mm).

FIG. 4 is a cross-sectional view of a medium length tube of FIG. 1h. The length of 16h is 0.570 inches (14.5 mm). The bevel 40 allows the tube to fit neatly against the sphere 30a or 30b of a coupling means. The cavity is tapered so that the width 18 at the entrance is slightly larger than the width 17 near the bottom of the cavity. The depth of the cavity is slightly longer than the length 28 of the arm 11 of a coupling means. The dimensions of the cavity are such that when the arm 11 of a coupling means is pressed firmly into the cavity of the tube, a tight, rigid bond is formed between the tube and the coupling means. This frictional bond is an important aspect of the present invention. The wall 26 is thicker than the wall 25 of the shorter tube of FIG. 3 to provide additional strength.

FIG. 5 is a cross-sectional view of a long tube of FIG. 1p. The length of the tube 16p is 0.840 inches (21.3 mm). The bevel 40 is similar to that of FIG. 4. The cavity is tapered with dimensions 17 and 18 such that when the arm 11 of a coupling means is pressed firmly into the cavity of the tube a strong, frictional bond is formed between the two components. The wall 27 is thicker than the wall 26 of a medium length tube so that unnecessary plastic is not consumed during the manufacturing operation.

Using the scale of 0.49 inches (12.5 mm) per Angstrom, the distance between the centers of coupling means 30a or 30b when joined to the ends of a medium length tube is 0.76 inches (19.2 mm) representing 1.54 Angstroms. When a long tube is used the distance between the centers of the coupling means is 0.89 inches (22.6 mm) representing a distance of 1.81 Angstroms between adjacent atoms.

One of the objects of this invention is to provide skeletal model building components that may be used in conjunction with the well known Corey-Pauling-Koltum space filling models and such complementary use is possible when the tubes and coupling means are manufactured with the dimensions described above. However, skeletal models of a larger scale may be required for some purposes and these may be built using the components of this invention if certain dimensions of the components are changed. Thus, the tubes of FIG. 1 may be made longer so that the lengths 16a, 16h, and 16p of FIGS. 3, 4 and 5 respectively are 0.89 inches (22.6 mm), 1.03 inches (26.7 mm) and 1.24 inches (31.5 mm) respectively such that the distances between the coupled atom centers are 1.07 inches (27.2 mm), 1.21 inches (30.8 mm) and 1.43 inches (36.2 mm) and represent 1.36 Angstroms, 1.54 Angstroms and 1.81 Angstroms respectively. The other dimensions are as described above and the completed models will have a scale of 0.78 inches (20 mm) per Angstrom. It will be apparent to those skilled in the art that other changes may be made in the dimensions to provide skeletal models of larger or smaller scale than exemplified in these specifications.

Since it is one of the objects of this invention to provide skeletal model building components that may be used to construct models of complex bio-organic macromolecules, the components must not only be held from coming apart, they must also be held so that rotation about a tube or bond is prevented, so that the complex structures will be held in position and prevented from collapsing. The provision of plastic coupling means and plastic tubes the arms and/or cavities respectively of which are tapered accomplishes this objective in a simple and convenient manner without the disadvantages of using glue or cement which must first be applied and which requires a length of time to harden.

It is a further object of this invention to provide skeletal models with a color code such that every atom of the molecule is immediately recognizable. Other model building kits have either the bonds color coded or the atom centers color coded, but the advantages of ease of recognition and aesthetic beauty which is provided by having both the atom centers and the bonds color coded has not been realized heretofore.

FIG. 1 is drawn actual size, but FIGS. 2 through 5 are drawn with a scale larger than actual size. FIG. 6 is drawn to approximately the actual size of an assembled group of construction units. FIGS. 6, 7 and 8 illustrate models of organic groups assembled in accordance with this invention. FIG. 6 illustrates the construction of a trans, planar peptide bond such as is found as a repeating unit in the assembled models of proteins and polypeptides. The figure shows five tubes of FIG. 1 and the spherical portions 30b of two planar, trigonal coupling means of FIG. 2b. The colors of the respective atoms are represented by appropiate hatching, i.e., cross-hatched areas are black and represent carbon, diagonally hatched areas are blue and represent nitrogen, vertically hatched areas are red and represent oxygen and the unhatched area represents hydrogen. The cross-hatched spherical coupling means 30$b$ represents the carbonyl carbon atom and the diagonally hatched spherical coupling means 30$b$ represents the planar nitrogen atom of the amide group. The five connecting tubes 50$h$, 50$c$, 50$b$, 50$k$, and 50$i$ represent respectively the carbon-carbon, carbonyl, carbon-nitrogen, nitrogen-hydrogen and nitrogen-carbon bonds of the peptide unit. The bond between the carbonyl group and the amino group, 50$b$, is shorter than the nitrogen-carbon bond 50$i$ or the carbon-carbon bond 50$h$, as is required for an accurate representation of a peptide unit. These three bonds are the only ones whose length is critical in the construction of the main chain of even the most complex polypeptide model. The whole arrangement of the model of a peptide bond shown in FIG. 6 is rigid and the centers of all of the atoms of which it is composed lie in the single plane 19 as shown in the drawing.

FIG. 7 is an enlarged view of the model of a hydrogen bond between a carbonyl oxygen and an amino hydrogen. The carbonyl group is represented by the color coded black and red connecting tube 50$c$ and the red tube 50$d$ which make an angle of 120° with one another. This is achieved by using the coupling means of FIG. 3$b$ and removing one of the arms 11 of said coupling means. The center of the oxygen atom of the carbonyl group is represented by the spherical portion 30$b$. The nitrogen-hydrogen bond is represented by the blue and white tube 50$k$ which is connected to van der Vaals radius 50$d$ of the oxygen atom by the linear coupling means 30$c$.

Models of other angular arrangements of hydrogen bonds are made by substituting one or another of the coupling means for 30$b$ and 30$c$. Thus, both may be linear by using two linear coupling units 30$c$ or both may be angular by using the coupling units 30$a$ and/or 30$b$ and removing the unused valence arms 11. It has been found by experiment that the length of the tube required for hydrogen bond construction is adequately represented by the single length described above for FIG. 1$k$, 1$l$ and 1$m$. A continuous range of angular possibilities is provided for construction of hydrogen bonds by having the coupling means of FIG. 2$c$ made of aluminum which can be bent to any desired angle.

FIG. 8 illustrates the use of tubes of FIG. 1 and coupling means FIG. 2$b$ for the construction of the model of an imidazole ring. In this instance the ring is five membered and the plastic components bend to provide the slightly smaller angles of a planar five membered ring as shown in the drawing. In the drawing the hatching representing the color code has been omitted for the sake of clarity but the tubes 50$h$, 50$j$, 50$k$, 50$a$ and 50$b$, represent, respectively, an aliphatic carbon-carbon, carbon-hydrogen, nitrogen-hydrogen, aromatic carbon-carbon and aromatic carbon-nitrogen bonds. The spheres 30$b$ represent carbon and nitrogen atoms. Since one of the nitrogen atoms of the imidazole is bonded to only two atoms one of the arms of the sphere 30$b$ (facing the viewer in FIG. 8) is removed.

It will be apparent that the construction of models of organic compounds using the construction units of this invention is not limited in any way by the few examples chosen to illustrate the invention. In fact the construction units of this invention can be used alike for models of simple and complex organic compounds. They may be disassembled by the application of force to pull the components apart or they may be bonded permanently in an unobtrusive manner as is required for models of proteins and enzymes.

In FIG. 9 are shown seven connecting tubes of FIG. 1 representing bonds and three coupling means of FIG. 2 representing atom centers arranged to form a peptide unit. To form the backbone of a polypeptide chain a series of such peptide units is connected together, head to tail to form trans, planar peptide bonds as in FIG. 6. The connecting tubes 50$c$, 50$b$, 50$h$, 50$j$, 50$i$, and 50$k$ represent, respectively, the carbonyl group, the carbon-nitrogen amide bond, carbon-carbon bonds (one connecting atoms in the main chain and one to be connected to a side chain), the carbon-hydrogen bond of the alpha carbon atom, the carbon-nitrogen bond, and the nitrogen-hydrogen bond. The two coupling means 30$b$ will each form part of the trans, planar peptide bond while the alph carbon atom of the amino acid of the peptide unit is represented by the coupling means 30$a$.

The scientific literature teaches that skeletal models of polypeptides can be constructed using only the rotational angle about the nitrogen-alpha carbon bond and the rotational angle about the bond joining the alpha carbon and the carbonyl group. This is true because all of the peptide bonds are trans and planar.

FIG. 9 shows the measurement of the rotational angle 22 about the nitrogen-alpha carbon bond 50$i$. The plane of the amino group consisting of tubes 50$k$, 50$i$ and coupling means 30$b$ is represented by 21. The amino group is placed so that the nitrogen-hydrogen bond 50$k$ points toward the origin of the angle 22 to be measured. A conventional protractor is used to measure the rotational angle 22 between this plane and the bond 50$h$ between the coupling means 30$a$ and 30$b$. The desired angle 22 is obtained by rotating the carbonyl carbon coupling means 30$b$ about the connecting tube 50$i$ with the tube 50$i$ attached loosely to the arm of 30$a$. The tube 50$i$ is then pressed firmly onto the arm of 30$a$ to fix the angle permanently.

FIG. 10 shows the measurement of the second rotational angle 23 of the peptide unit of FIG. 9. In this case the rotational angle 23 is about the bond joining the alpha carbon atom 30$a$ and the carbonyl carbon 30$b$ which in FIG. 10 is immediately behind 30$a$ and hidden from view. The plane of the amide group is represented in this view by the carbonyl carbon 50$c$, the alpha carbon atom 30$a$ and the carbon-nitrogen bond 50$b$. The oxygen of the carbonyl group 50$c$ points toward the origin of the angle to be measured which is between the plane of 50$c$, 30$a$, and 50$b$ and the bond 50$i$ between the alpha carbon atom 30$a$ and the amino nitrogen 30$b$. A conventional protractor is used and the coupling means 30$a$ with its attached bonds 50$j$, 50$h$ and 50$i$ is rotated until the desired angle is obtained. This angle is measured with the tube 50$h$ loosely attached to the arm of 30$a$ and the components are then pressed firmly together to fix the angle permanently. Two peptide units such as in FIGS. 9 and 10 are then connected together in such a manner that the nitrogen-hydrogen bond 50$k$ of FIG. 10 is trans and planar to the carbonyl group 50$c$ of FIG. 9 as shown in FIG. 6. This is achieved by inserting the arm 11 of the amine group of FIG. 10 into the tube 50$c$ of the peptide unit of FIG. 9 and pressing it in place in proper position.

Individual peptide units such as that shown in FIG. 9 may be identified by numbers on white adhesive tape wrapped around the white end of a connecting tube 50j attached to the alpha carbon atom. The main polypeptide chain of a protein or enzyme is constructed by connecting peptide units in numerical sequence.

Additional features such as hydrogen bonds give support to the polypeptide chain. Furthermore the chain may be suspended on temporary supports unitl such interconnections are formed. The complete enzyme model may be supported on three or four rods of clear plastic by positioning these support rods under appropiate alpha carbon atoms.

When the backbone chain of a polypeptide model is completed the side chains are built of the appropiate connecting tubes and coupling means representing atom centers and attached to the alpha carbon connecting tubes 50h of FIG. 10. The conformation of the side chains may be fixed with permanent bonds by pressing the units firmly together after first measuring the appropiate rotational angles about the bonds joing the individual atoms. Such angles are supplied in the scientific literature for a number of enzymes. The entire model of a complete enzyme is highly colored and completely visible even to its interior. It is aesthetically pleasing as a work of modern art.

It is readily apparent that the skeletal models of the present invention may be used not only for building models of proteins but also of polysaccharides, nucleic acids and all manner of smaller organic compounds. While the preferred embodiments of the invention have been illustrated it is obvious that numerous additions and changes may be made without departing from the spirit and scope of the invention. For example, the entire assembly of components may be supplied as a kit with a set of instructions and sold as a model building toy. In addition the models of enzymes and receptor sites may be prefabricated using the components of this invention and sold as complete units available to students for the study of enzyme structure and mechanism.

When used in conjunction with the Corey-Pauling-Koltun space filling models numerous advantages of the complementary design of the skeletal models of the present invention become apparent. For instance, a hole may be drilled in the connecting bond of the hemisphere representing the volume of a hydrogen atom in the Cory-Pauling-Koltun models. The hemispheres may then be affixed over the tubes representing the hydrogen atoms of the skeletal model of an enzyme and the surface of the model will resemble the surface of a space filling model of the enzyme.

FIG. 11 illustrates how the Corey-Pauling-Koltun van der Vaals space filling envelope 24 which is commercially available can be made to fit over one of the connecting tubes 50k representing nitrogen-hydrogen bonds of an ammonium group. In this drawing the center of the nitrogen atom is represented by the center of the sphere of the coupling means 30a and the carbon-nitrogen bond is represented by the connecting tube 50i.

When the construction units of this invention are assembled into the skeletal model of an enzyme having a specificity cavity the connecting tubes representing bonds to hydrogen atoms which lie on the internal surface of the specificity cavity may be fitted with Corey-Pauling-Koltun van der Vaals space filling envelopes 24 as in FIG. 11. In this way the internal envelope of the specificty cavity becomes clearly visible and defined with sufficient accuracy to be fitted with a Corey-Pauling-Koltun space filling model of a substrate or inhibitor of the enzyme. It will be apparent that the molecular model assembly kit of this invention thus opens the door for studies of complementary bioorganic molecules which were not possible heretofore. The use of the models of this invention will facilitate the study of antibody-antigen interaction and of drug-receptor complexes. THe inexpensive nature of the components and the ease of assembly will also be an advantage in the study of models of synthetic polymers. It will also be apparent that students will find models of great assistance in the study of the structures of smaller organic molecules.

It will be apparent to those skilled in the art that numerous varients are possible in the actual shape and design of the basic construction units of this invention. For example, the ends of the arms of the coupling means of FIG. 2 may be rounded and/or the bottom of the cavities of the tubes of FIG. 1 may be flat as shown in FIG. 3 or rounded. Thus, while preferred features have been described in this specification it is apparent that deletions, changes and additions may be made without departing from the spirit and scope of this invention.

What is claimed is:

1. A color coded molecular model assembly kit for representing complex organic macromolecular structures and shapes, comprising two basic and complementary construction units capable of being interlocked, said first basic construction units being color coded tubes to represent at least the major part of the bonds of joined atoms or organic molecules consisting of three different lengths of said tubes; said lengths being such that when coupled to two of said second basic construction units the distances between the centers of the coupling means represent and are substantially proportional to 1.36 Angstroms, 1.54 Angstroms and 1.81 Angstroms respectively and said second basic construction units being color coded coupling means for said first construction units according to the valency of each said atom and centers of said coupling means representing atom centers, said coupling means having radial arms for precisely positioning said tubes, said radial arms being rods substantially located on the surface of a sphere with the center of the coupling unit being the center of the sphere, wherein said first and second construction units are made of plastic and are capable of being joined together and held immobile by friction by having said radial arms and/or the cavities of said tubes tapered so that a rigid bond is formed when said tube is pressed firmly onto the arm of said coupling means so that models of complex organic macromolecules may be constructed such that the distance between the centers of two coupling means represents and is substantially proportional to the distance between joined atoms, at least one type of said coupling means adapted for planartrigonal coupling of three said tubes separated by angles of about 120° and/or adapted for tetrahedral coupling of four said tubes separated by angles of about 109°.

2. The kit of claim 1 wherein said first and second construction units are made of plastic and are capable of being joined together and held immobile by friction by having said radical arms and the cavities of said tubes tapered so that a rigid bond is formed when said tube is pressed firmly onto the arm of said coupling means.

3. The kit of claim 1 wherein said first and second construction units are made of plastic and are capable of being joined together and held immobile by friction by having said radial arms tapered so that a rigid bond is formed when said tube is pressed firmly onto the arm of said coupling means.

4. The kit of claim 1 wherein said first and second construction units are made of plastic and are capable of being joined together and held immobile by friction by having the cavities of said tubes tapered so that a rigid bond is formed when said tube is pressed firmly onto the arm of said coupling means.

5. The kit of claim 1 wherein a scale of 0.49 inches (12.5 mm) representing 1.00 Angstrom is used and the lengths of said tubes are such that when coupled to two of said second construction units the distances between the centers of the coupling means are approximately 0.67 inches (17.0 mm), 0.76 inches (19.2 mm) and 0.89 inches (22.6 mm) respectively.

6. The kit of claim 1 wherein a scale of 0.79 inches (20.0 mm) representing 1.00 Angstrom is used and the lengths of said tubes are such that when coupled to two of said second construction units the distances between the centers of the coupling means are approximately 1.07 inches (27.2 mm), 1.21 inches (30.8 mm) and 1.43 inches (36.2 mm) respectively.

7. The kit of claim 1 wherein tubes of said first length are color coded to indicate bonds as follows: black for C—C (aromatic), black-blue for C—N (aromatic or amide), black-red for C=O (carbonyl) and C—O (ether), red for oxygen (van der Vaals), blue for nitrogen (van der Vaals), black-pale green for C—F, and blue-red for N—O; tubes of said second length are color coded to indicate bonds as follows: black for C—C (aliphatic), black-blue for C—N (single bond), black-white for C—H, blue-white for N—H, red-white for O—H, black-green for C—Cl, yellow-red for P—O or S—O and yellow-white for S—H; and tubes of said third length are color coded to indicate bonds as follows: black-brown for C—Br, black-violet for C—I, black-yellow for C—S and yellow for S—S; and said coupling means are color coded as follows: black for carbon, blue for nitrogen, red for oxygen and yellow for sulfur or phosphorus.

8. The kit of claim 7 wherein said color code is created by the use of paint on said colored plastic tubes.

9. The kit of claim 7 whereing said color code is created by having the plastic tubes of one color and by the additional use of sleeves of thin colored plastic with an internal diameter such that the sleeve fits neatly over the tube that is to be provided with a second color.

* * * * *